Aug. 2, 1927.
J. P. TARBOX
1,637,666
DOUBLE NUT FOR DUAL WHEELS
Original Filed Sept. 8, 1926
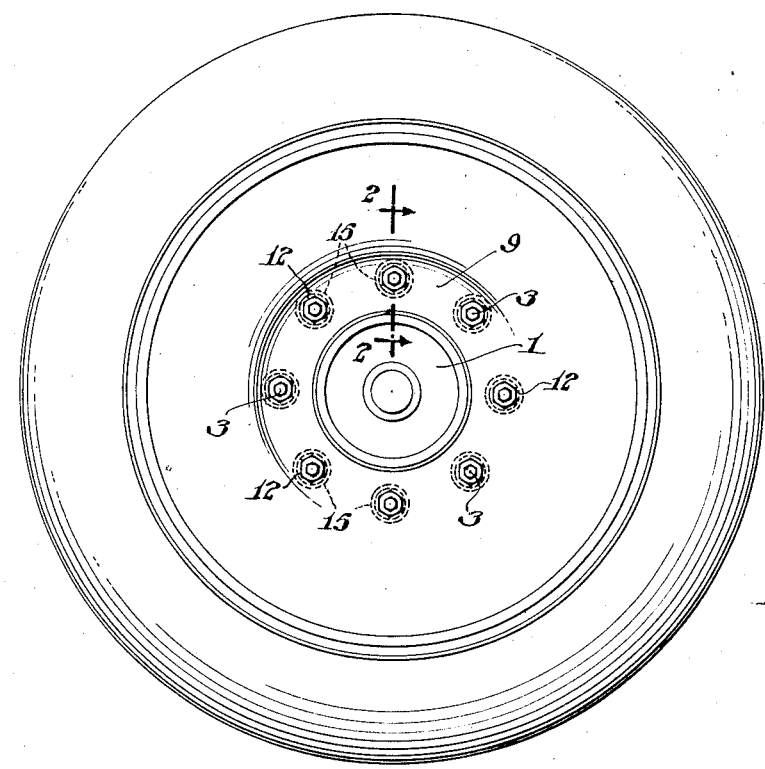
Fig.1.
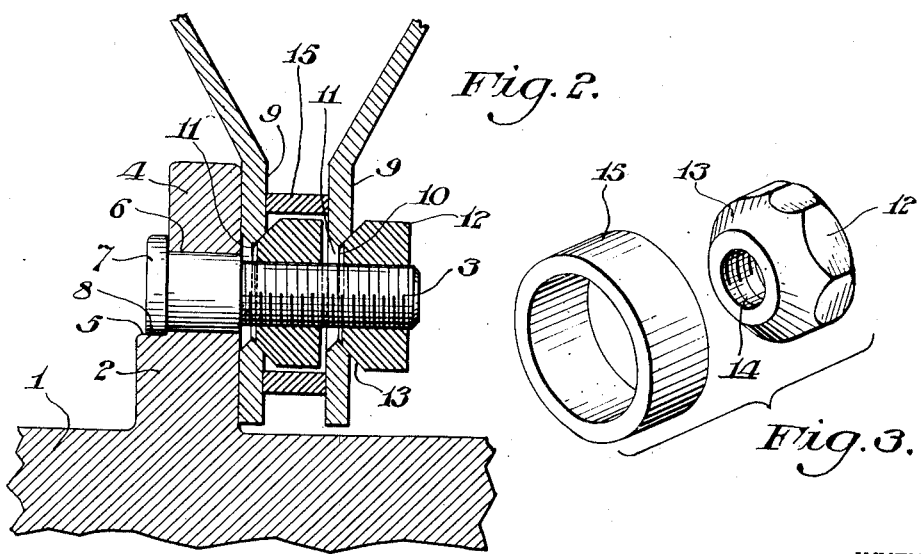
Fig.2.
Fig.3.
INVENTOR,
J. P. Tarbox Patented Aug. 2, 1927.

1,637,666

UNITED STATES PATENT OFFICE.

JOHN P. TARBOX, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

DOUBLE NUT FOR DUAL WHEELS.

Application filed September 8, 1926, Serial No. 134,149. Renewed June 23, 1927.

This invention relates to fastening devices in general and has particular reference to a fastening means for detachably securing dual wheels to the wheel hub.

The general object of the present invention is to provide a fastening arrangement for dual wheels wherein each wheel shall be independently and detachably connected to the wheel hub by a plurality of nuts, all of which are of substantially the same size and shape, thus permitting one wrench to suffice for all and insuring the same tension being placed on each wheel.

Another object is to provide a fastening arrangement of the aforementioned character which shall consist of few parts that are simple in construction and inexpensive to manufacture.

With these and other objects in view, the invention may be stated to consist in the various novel features of construction and arrangement, all of which will be fully described hereinafter, and pointed out in the appended claims.

In the drawing accompanying and forming part of the application:

Figure 1 is a side elevation of a dual wheel constructed in accordance with my invention.

Figure 2 is an enlarged sectional view taken on the line 2—2 of Fig. 1, and;

Fig. 3 is a perspective view of one of the spacing collars and fastening nuts employed by me.

In practice, a wheel hub 1 of any approved construction is formed with a radial flange 2 that carries a plurality of laterally projecting studs 3. In the present instance I have shown the outer peripheral portion 4 of the flange reduced in thickness to define a shoulder 5. The studs 3 project through a circumferential series of apertures 6 formed in the reduced portion 4 of the flange and each stud is provided with a head 7, having a flattened side 8 that seats on shoulder 5 and prevents the stud from rotating.

The wheels to be fastened to the hub in the present instance are of the disc type, and are preferably identical in size and shape so as to be interchangeable. The inner portion 9 of each disc is formed with an annular series of apertures 10 of a diameter considerably larger than that of the laterally projecting threaded portions of studs 3 so that considerable clearance will be obtained therebetween as clearly shown in Fig. 2. These apertures are countersunk on each side of the disc to provide conical seats 11.

The nuts for fastening the discs to the hub flange comprise a prismatic wrench receiving portion 12, a tapered or conical portion 13, and a central threaded bore 14 that is adapted to receive a stud 3.

A dual wheel is assembled by first placing a wheel with its proper side toward the hub flange and with studs 3 projecting through apertures 10 therein. A nut is then threaded on each stud with the tapered or conical portion 13 thereof engaged with the conical seat 11, in the wheel disc, thus forcing the inner portion 9 of the disc into engagement with the hub flange and at the same time centering the wheel with respect to the hub. An annular spacing collar 15 is next placed over each nut and the outer wheel is then placed in proper position with the studs 3 projecting through apertures 10 therein. A second nut is then applied to each stud to cause the tapered or conical portion thereof to engage the conical seat 11 of the wheel disc. Tightening of this second series of nuts forces the outer wheel disc against the spacing collars and simultaneously centers the wheel with respect to the hub.

With the construction described above, it will be noted that tightening of the inner or first series of nuts will cause each nut, in finding its seat, to very slightly bend its stud just beyond the point where it leaves the hub flange. The outer series of nuts in finding their seats will likewise cause a very slight bending of the studs just beyond the first series of nuts. The reason for this slight bending is that it is impossible in production to accurately drill or ream a number of holes in two separate elements which will align with complete accuracy. It will be understood, however, that the aforementioned bending is of a very small degree, but is sufficient to insure a good seat between the nuts and respective discs and is highly desirable as it serves to retain the nuts in position by placing a tension between the nuts and discs which increases the friction therebetween.

By employing a construction wherein the inner and outer series of nuts are identical in size and shape, the cost of production is greatly reduced and one wrench may be used for tightening both series of nuts, thus insuring the same tension on each wheel.

Having thus described my invention, what I desire to claim by Letters Patent is:—

1. A dual wheel construction comprising a hub having a plurality of studs projecting laterally therefrom, a pair of wheels mounted on said hub and having apertures through which said studs project, a pair of nuts threaded on each stud and engaged one with each wheel and a spacing element interposed between said wheels.

2. A dual wheel construction comprising a hub having a plurality of studs projecting laterally therefrom, a pair of wheels mounted on said hub and having apertures through which said studs freely project, a pair of nuts threaded on each stud and having seating portions engaged one with each wheel, and a spacing element interposed between said wheels.

3. A dual wheel construction comprising a hub having a plurality of studs projecting laterally therefrom, a pair of wheels mounted on said hub and having apertures through which said studs freely project, the metal of said wheels adjacent said apertures being formed to define conical seats, a pair of nuts threaded on each stud and having each a tapered portion adapted to engage a conical seat, and a spacing element interposed between said wheels.

4. A dual wheel construction comprising a hub having a plurality of studs projecting laterally therefrom, a pair of wheels mounted on said hub and having apertures through which said studs project, a pair of nuts threaded on each stud and engaged one with each wheel, and a removable spacing element positioned adjacent each stud and interposed between said wheels.

5. A dual wheel construction comprising a hub having a plurality of studs projecting laterally therefrom, a pair of wheels mounted on said hub and having apertures through which said studs project, a pair of nuts threaded on each stud and engaged one with each wheel, and a removable annular spacing collar surrounding each stud and interposed between said wheels.

6. A dual wheel construction comprising a hub having a plurality of studs projecting laterally therefrom, a pair of wheels mounted on said hub and having apertures through which said studs freely project, the metal of said wheels adjacent said apertures being formed to define conical seats, a pair of nuts threaded on each stud and having each a tapered portion adapted to engage a conical seat and a plurality of removable spacing elements positioned one adjacent each stud and interposed between said wheels.

7. A dual wheel construction comprising a hub having a plurality of studs projecting laterally therefrom, a pair of disc wheels mounted on said hub and having apertures through which said studs freely project, the metal of said discs adjacent said apertures, being formed to define conical seats, a pair of nuts threaded on each stud and having each a tapered portion adapted to engage a conical seat, and a removable annular spacing collar surrounding each stud and interposed between said discs.

In testimony whereof he hereunto affixes his signature.

JOHN P. TARBOX.